United States Patent [19]

Suggitt et al.

[11] Patent Number: 5,458,808
[45] Date of Patent: Oct. 17, 1995

[54] PROCESS FOR CONTINUOUSLY CONTROLLING THE HEAT CONTENT OF A PARTIAL OXIDATION UNIT FEED-GAS STREAM

[75] Inventors: Robert M. Suggitt, Wappinger Falls; Raymond F. Wilson, Fishkill; Wing-Chiu F. Fong, Yorktown Heights, all of N.Y.

[73] Assignee: Texaco Inc., White Plains, N.Y.

[21] Appl. No.: 178,999

[22] Filed: Jan. 7, 1994

[51] Int. Cl.$^6$ .................................... C07C 1/02
[52] U.S. Cl. ........................................ 252/373
[58] Field of Search ............................. 252/373

[56] References Cited

U.S. PATENT DOCUMENTS

| | | | |
|---|---|---|---|
| 4,390,347 | 6/1983 | Dille et al. | 252/373 |
| 5,152,975 | 10/1992 | Fong et al. | 423/652 |
| 5,152,976 | 10/1992 | Fong et al. | 423/652 |
| 5,625,635 | 11/1993 | Giammatteo et al. | 252/373 |

*Primary Examiner*—Johann Richter
*Attorney, Agent, or Firm*—George J. Darsa; Christopher Nicastri

[57] ABSTRACT

A process is provided for continuously controlling the hydrocarbon heat content and flow rate of a partial oxidation unit feed-gas stream under conditions where the composition and hence the hydrocarbon heat content of the feed-gas stream is subject to variation. The hydrocarbon heat content of the incoming gases is continuously measured and compared against a design hydrocarbon heat content. An evaluating means calculates whether a moderator is required to decrease the hydrocarbon heat content to the design hydrocarbon heat content or a supplemental high hydrocarbon heat content gas is required to increase the hydrocarbon heat content to the design hydrocarbon heat content. The process utilizes recycle synthesis gas as a moderator. Once the determination is made, the process automatically adjusts flow rates of the recycle synthesis gas stream, the supplemental high hydrocarbon heat content gas stream and the incoming feed-gas stream to provide a partial oxidation unit feed-gas stream with a constant optimum hydrocarbon heat content and flow rate.

30 Claims, 2 Drawing Sheets

PROCESS FOR CONTINUOUSLY CONTROLLING THE HEAT CONTENT OF A PARTIAL OXIDATION UNIT FEED-GAS STREAM

BACKGROUND OF THE INVENTION

1. Field of the Invention

The present invention relates to a process for continuously controlling the hydrocarbon heat content of a partial oxidation unit feed-gas stream where the hydrocarbon heat content of the feed-gas stream is subject to variation. More particularly, the present invention relates to a process for continuously controlling the hydrocarbon heat content of such a partial oxidation unit feed-gas stream using recycle synthesis gas as a moderator.

2. Description of the Background Art

Partial oxidation processes are efficient, environmentally sound methods of producing several useful products, including hydrogen, precursors for oxochemical syntheses and electricity. A variety of feed-gases can be used in partial oxidation processes, including natural gas, refinery off-gases, liquified petroleum gas, etc. These feed-gases typically have different hydrocarbon heat contents per unit volume (hereinafter referred to as "hydrocarbon heat content") and because of this a partial oxidation process is typically designed around a specific feed-gas. As used herein, "hydrocarbon heat content" is defined as the heat evolved after complete combustion of paraffinic, olefinic and aromatic components, and after any water has condensed to the liquid state. In a partial oxidation reaction, the primary components of the gaseous feed stream which contribute useful heat are hydrocarbons. Although hydrogen and carbon monoxide generate heat when combusted with oxygen, in a partial oxidation reaction, hydrogen and carbon monoxide (along with nitrogen and carbon dioxide) are effectively inert and contribute no heat to the partial oxidation reaction. For example, natural gas is slightly deficient in hydrocarbon heat content for the partial oxidation reaction. In this case, excess oxygen is needed to burn some of the synthesis gas which is produced to maintain the desired operating temperature in the partial oxidation unit. This method has shortcomings in that more oxygen is required and more product is consumed. Preheating the natural gas can make up for some of this hydrocarbon heat content deficiency, but not all of it.

If the feed-gas has too high a hydrocarbon heat content per unit volume, e.g., above about 1100 Btu/standard cubic foot (Btu/SCF), a moderator is needed for temperature control to protect the partial oxidation unit from overheating. A moderator is a material which is added to the feed-gas to absorb thermal energy without undergoing significant chemical change. In the past, partial oxidation units have been designed to handle specific hydrocarbon feed-stocks, with known, relatively stable hydrocarbon heat contents. When the hydrocarbon heat content of the feedstock is high enough that a moderator is needed, provision is made to introduce steam, $CO_2$, or water into the partial oxidation unit on a steady state basis.

If a partial oxidation unit is operated under conditions where the hydrocarbon heat content of the feed-gas stream can change over time (e,g., where the partial oxidation unit is used as a means for disposing of one or more refinery waste gases whose combined hydrocarbon heat content is variable, depending on which units are on-line), the conventional steady state addition of moderator will not provide the desired results, i.e., optimum partial oxidation unit temperature. If the hydrocarbon heat content of the feed-gas stream increases, the moderator will be insufficient, and the resulting feed-gas stream will have an excessive hydrocarbon heat content, leading to undesirably higher operating temperatures in a partial oxidation reactor. If the hydrocarbon heat content of the feed-gas stream decreases, the moderator will be too much and the resulting feed-gas stream will have a deficient hydrocarbon heat content, and lower than optimum partial oxidation operating temperatures. This inability to adapt quickly to the changing hydrocarbon heat content of a feed-gas prevents operators from using a different feed-gas in a partial oxidation unit without making significant changes to process design to accommodate the different feed-gas. It is our understanding that prior to the present invention, there has not been a partial oxidation process which operates at a relatively constant, optimum temperature on a relatively constant oxygen and partial oxidation unit feed-gas flows, all while being operated on a feed-gas stream whose hydrocarbon heat content is variable and not known in advance. What is needed is a reliable, fast-acting (on the order of a few seconds) solution for providing more or less moderator to a system as the hydrocarbon heat content of the feed-gas changes. Having standby high pressure steam, carbon dioxide or water ready to inject into the gasifier feed is not an efficient, reliable means of assuring a moderator the instant it is needed.

Accordingly, the present invention provides a cheap, efficient and reliable means of mixing a moderator or a supplemental high hydrocarbon heat content gas into a feedstock as soon as the hydrocarbon heat content of the feedstock varies from a predetermined desirable level. In addition, the process injects the moderator or the supplemental high hydrocarbon heat content gas in an amount appropriate to deliver a feed-gas with an optimal hydrocarbon heat content to the partial oxidation unit, at a constant oxygen flow rate. An advantage of the present invention is that the process can be operated on a variety of feed-stocks, or combinations thereof, which have varying and unpredictable hydrocarbon feed-stocks without having to make changes in process design.

SUMMARY OF THE INVENTION

The present invention is directed to a process for continuously and immediately controlling the hydrocarbon heat content of a constant flow partial oxidation unit feed-gas stream comprising the steps of:

a) determining the hydrocarbon heat content, $H_0$, of the raw feed-gas stream and the hydrocarbon heat content, $H_R$, of a recycle gas stream;

b) establishing signals which represent the hydrocarbon heat contents of the raw feed-gas stream, $H_0$, and the recycle gas stream, $H_R$;

c) transmitting the signals to an evaluating means which compares the hydrocarbon heat content of the raw feed-gas stream, $H_0$, to a partial oxidation unit feed-gas design hydrocarbon heat content, $H_D$, and which determines:

i. a flow rate for the raw feed-gas stream, $F_0$, according to the equation:

$$F_0 = F_D \frac{(H_D - H_R)}{(H_0 - H_R)},$$

if $H_0$ is greater than $H_D$, or otherwise according to the equation:

$F_0 = F_D$; and ii. a flow rate for the recycle gas stream, $F_R$, according to the equation:

$F_R = F_D - F_0$;

where $F_D$ represents the design flow rate of a partial oxidation unit feed-gas stream;

d) adjusting the flow rate of the raw feed-gas stream in accordance with the value $F_0$ calculated in step c);

e) adjusting the flow of the recycle gas stream in accordance with the value $F_R$ calculated in step c);

f) combining the raw feed-gas stream and the recycle gas stream, if any, to form the partial oxidation unit feed-gas stream; and g) partially oxidizing the partial oxidation unit feed-gas to produce a synthesis gas mixture comprising carbon monoxide and hydrogen.

In a preferred embodiment, the process further comprises the steps:

h) reacting the synthesis gas mixture with steam over a water gas shift catalyst to convert the carbon monoxide into a shifted gas mixture which primarily includes carbon dioxide and hydrogen; and i) purifying the shifted gas mixture to produce high purity hydrogen and a reject gas mixture of impurities In another embodiment, the present invention is directed to a process for continuously and immediately controlling the hydrocarbon heat content of a partial oxidation unit feed-gas stream of uncertain composition comprising the steps of:

a) determining the hydrocarbon heat content of the raw feed-gas stream, $H_0$, the hydrocarbon heat content of a recycle gas stream, $H_R$, and the hydrocarbon heat content of a supplemental gas stream, $H_S$;

b) establishing signals which represent the hydrocarbon heat contents of the raw feed-gas stream, $H_0$, the recycle gas stream, $H_R$, and the supplemental gas stream, $H_S$;

c) transmitting the signals to an evaluating means which compares the hydrocarbon heat content of the raw feed-gas stream, $H_0$, to a partial oxidation unit feed-gas design hydrocarbon heat content, $H_D$, and which determines flow rates for the raw gas stream, $F_0$, the recycle gas stream, $F_R$, and the supplemental gas stream, $F_S$, according to the equations:

$$F_0 = F_D \frac{(H_D - H_R)}{(H_0 - H_R)}$$

$F_R = F_D - F_0$ $F_S = 0,$ if $H_0$ is greater than $H_D$, or according to the equations:

$$F_0 = F_D \frac{(H_D - H_S)}{(H_0 - H_S)}$$

$F_R = 0$ $F_S = F_D - F_0,$ if $H_0$ is less than $H_D$, or according to the equations $F_0 = F_D$ $F_R = 0$ $F_S = 0$ if $H_0$ is equal to $H_D$, where $F_D$ represents the design flow rate of a partial oxidation unit feed-gas stream;

d) adjusting the flow of the recycle gas stream in accordance with the value $F_R$ calculated in step c);

e) adjusting the flow of the supplemental gas stream in accordance with the value $F_S$ calculated in step c);

f) adjusting the flow rate of the raw feed-gas stream in accordance with the value $F_0$ calculated in step c);

g) combining the raw feed-gas stream, the recycle gas stream, if any, and the supplemental gas stream, if any, to form the partial oxidation unit feed-gas stream; and h) partially oxidizing the partial oxidation unit feed-gas to produce a synthesis gas mixture comprising carbon monoxide and hydrogen.

In a preferred embodiment, this process further comprises the steps of:

i) reacting the synthesis gas mixture with steam over a water gas shift catalyst to convert the carbon monoxide into a shifted gas mixture which primarily includes carbon dioxide and hydrogen; and j) purifying the shifted gas mixture to produce high purity hydrogen and a reject gas mixture of impurities

DETAILED DESCRIPTION OF THE INVENTION

The present invention provides a process for automatically monitoring the hydrocarbon heat content of a feed-gas and lowering or raising it to a desired level by continuously measuring the hydrocarbon heat content of a partial oxidation unit feed-gas stream and, when needed, introducing a moderator, preferably comprising a recycle synthesis gas, or a supplemental high hydrocarbon heat content gas, in an amount sufficient to lower or raise the hydrocarbon heat content of the feed-gas to a desired level. The process of the present invention can be used in conjunction with any gaseous feed partial oxidation unit process, such as, for example, the process described in U.S. Pat. No. 5,152,976, which is incorporated herein by reference. In particular, the process of the present invention can be used to improve any partial oxidation process where the makeup of the feed-gas is subject to change and with a corresponding change in hydrocarbon heat content.

The Partial Oxidation Process

A partial oxidation unit is typically operated on a hydrocarbon feed at a temperature of about 2200° F. to about 2800° F. At higher temperatures, the refractory elements and burner can be damaged by excessive temperatures. One of the factors which determine the operating temperature of the partial oxidation unit is the hydrocarbon heat content of the feed-gas. Ideally, the hydrocarbon heat content of the feed-gas should be at a level to optimize partial oxidation unit efficiency, e.g., in the vicinity of about 900–1100 Btu/SCF, say about 1000. The specific value depends upon other factors, including partial oxidation unit design and feed preheating, factors which are known to those skilled in the art.

Figure 1:
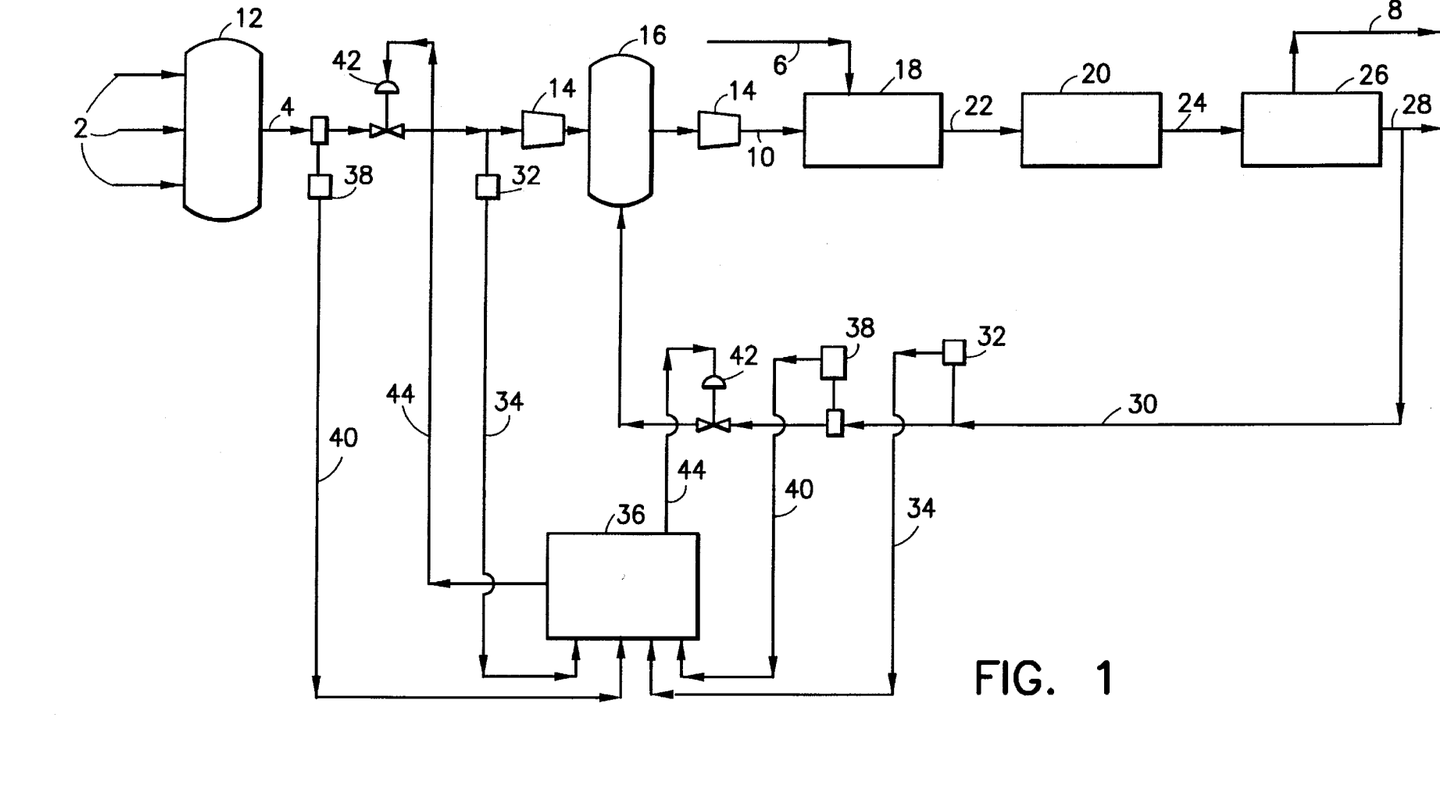
FIG. 1 is a schematic illustration of the steps involved in practicing a preferred embodiment of the present invention.

Referring to FIG. 1, the present invention enables the operators of partial oxidation units to employ one or more feed-stocks, delivered as raw feed-gas streams (2), where the composition of such feed-stocks (and the hydrocarbon heat contents of such feed-stocks) can change frequently or infrequently, without warning, and to large degrees. The operator can do this and simultaneously maintain a relatively constant oxygen flow through oxygen stream (6) and product output through product stream (8). Furthermore, the volumetric flow of partial oxidation unit feed-gas, through partial oxidation unit feed-gas stream (10) remains essentially constant. The present invention is especially useful in the context of a petroleum refinery, where the feed-gas can comprise refinery off-gases from several sources (described with particularity below) as well as natural gas.

The feedstock which is generally described as refinery off-gas is also known as waste gas, vent gas, net gas or tail gas. Refinery off-gas, as used herein, generally refers to the various gas streams generated by the individual processing units which are typically present in a refinery. Refinery off-gas generally contains saturated and unsaturated hydrocarbons and other impurities, such as organic sulphur, nitrogen species, and inorganic agents including $H_2S$, COS, $SO_x$, $NH_3$, HCN, and arsine. Some particular components include $H_2$, $N_2$, $O_2$, RSH, $CH_4$, $C_2H_4$, $C_2H_6$, $C_3H_6$, $C_3H_8$, $C_4H_8$, $C_4H_{10}$, $C_5H_{10}$, $C_5H_{12}$, CO, $CO_2$, and $H_2O$. The processing units (not shown) which can produce off-gas (the feed for the instant process) can include, but are not limited to, fluid catalytic cracking (FCC) units, thermal cracking units such as residual coking, delayed coking or fluidized coking units, catalytic reforming units, hydrotreating units, and pressure swing adsorption (PSA) units. Many of these processing units operate independently of each other and therefore virtually any combination of them can be producing off-gas at any time. The effluent gases from these units and any other sources, e.g. natural gas, are mixed in a mix tank (12) or surge tank prior to being routed to the partial oxidation unit (18). The stream emanating from the mix tank (12) is referred to herein as the combined raw feed-gas stream (4). It is possible to operate the present invention with only one raw feed-gas stream (2), and under such conditions the combined raw feed-gas stream (4) will comprise only one raw feed-gas stream (2) which has not been mixed with another. However, it is more likely that the combined raw feed-gas stream (4) will comprise the mixture of more than one raw feed-gas stream (2). The hydrocarbon heat content of the combined off-gas which is being produced at any particular time can vary dramatically; for example, the hydrocarbon heat contents can vary between about 600 Btu/SCF and about 2000 Btu/SCF, depending upon which refining units are delivering waste gas.

Refinery off-gas is generally characterized as including up to about 40 percent by volume of hydrogen and typically has a hydrocarbon heat content of at least about 600 Btu/SCF. Where a waste gas stream contains more than 40 percent by volume of hydrogen, it is generally preferred to recover a portion of the hydrogen by, for instance, pressure swing adsorption (not shown) and employ the remaining gas (which now contains less than 40 percent by volume of hydrogen) as the feedstock in the process of the present invention. For example, recovered gases from a catalytic reformer or hydrotreater typically contain methane, ethane, propane and trace amounts of higher saturated hydrocarbons together with hydrogen. Depending upon the amount of hydrogen removed (such as by a PSA unit), the hydrocarbon heat content of such gases can range from 600 to 2000 Btu/SCF.

Table I is provided to illustrate the concentration of the components present in the off-gas feedstock. A typical composition of an off-gas stream from an FCCU is also provided in Table I.

TABLE I

| Component | Mole Percent Range* | Typical FCC Unit Off-gas |
|---|---|---|
| $H_2$ | 8–40 | 19.54 |
| $N_2$ | 0–10 | 7.41 |
| $CH_4$ | 20–60 | 40.47 |
| $C_2H_4$ | 1–25 | 17.79 |
| $C_2H_6$ | 1–20 | 14.37 |
| $C_3H_6$ | 0–20 | 0.06 |
| $C_3H_8$ | 0–20 | 0.37 |
| $C_4H_8$ | 0–5 | — |
| $C_4H_{10}$ | 0–8 | 1.0 |
| $C_5+$ | 0–5 | — |
| CO | 0–5 | 1.0 |
| $CO_2$ | 0–5 | 250 ppm |
| $O_2$ | 0–0.8 | 1000 ppm |
| Acetylene | 0–5000 ppm | 100 ppm |
| Diolefins | 0–1000 ppm | 100 ppm |
| Aromatics | 0–1000 ppm | 200 ppm |
| RSH(mercaptans) | 10–1000 ppm | 10 ppm |
| $H_2S$ | 0–4 | 10 ppm |
| COS | 0–1 | 10 ppm |
| $SO_x$ | 0–100 ppm | 15 ppm |
| $NH_3$ | 0–100 ppm | 5 ppm |
| HCN | 0–50 ppm | 10 ppm |
| Arsine | 0–5 ppm | 20 ppb |
| Hydrocarbon Heat Content | 600–2000 Btu/SCF | 1020 |

*Values represent mole percent unless indicated otherwise.

In a typical partial oxidation process, the feed-gas is pressurized (14) to correspond to the desired pressure of the end product, plus an allowance for the pressure drop, about 100–150 psi, associated with passage through the partial oxidation (18) and subsequent processing steps, i.e., the feed-gas is pressurized to about 400 to about 2200 psig. Optionally, the feed-gas can be preheated in, for instance, a fired heater or heat exchanger. The feed-gas is then partially oxidized to produce a synthesis gas mixture (22) of carbon monoxide and hydrogen. The partial oxidation unit (18) is charged with the partial oxidation unit feed-gas (10) and oxygen (6), to permit the partial oxidation of the feed-gas. The oxygen (6) is introduced separately from the feed-gas (10) into the partial oxidation unit (18) by a partial oxidation burner (not shown), such as the one described in U.S. Pat. No. 3,874,592.

In a preferred embodiment, the partial oxidation unit (18) is a non-catalytic partial oxidation unit which includes a refractory-lined pressure vessel (not shown) and auxiliary gas cooling means (not shown), such as a heat recovery steam generator or a quenching chamber, which is further discussed hereinbelow. The partial oxidation unit (18) is typically operated at a temperature of about 2200° F. to about 2800° F. and a pressure of from about 200 psig to about 2000 psig. The residence time of the reactants in the partial oxidation unit (18) is usually about 2 to about 4 seconds. Thus, a predetermined quantity of the feed-gas is partially oxidized in about 2 to about 4 seconds. In the partial oxidation unit (18), synthesis gas (22) (i.e., carbon monoxide and hydrogen)is produced, preferably in an amount of at least about 2.0–3.5 moles of synthesis gas per mole of feed-gas. The synthesis gas is cooled in a quenching medium (not shown), such as water. The means for quenching the synthesis gas (e.g., a quench bath) can be contained in the partial oxidation unit (18) or it can be disposed outside of the unit.

In another preferred embodiment, the final product is hydrogen. The synthesis gas stream (22) is directed from the partial oxidation unit (18) into a shift converter (20). More particularly, hot synthesis gas (22) from the partial oxidation unit (18) is quickly cooled by direct contact with water (not shown), as described above, at the pressure of the partial oxidation unit (18) and passed directly to the carbon monoxide shift conversion reactor (20). As described in U.S. Pat. No. 3,545,926, sufficient water is vaporized into the hot synthesis gas to supply the steam required for the shift conversion reaction. In the shift converter (20), the steam is reacted with the carbon monoxide present in the synthesis gas to produce a shifted gas mixture (24) comprising carbon dioxide and hydrogen. With operating pressures of about 1000 psi, the equilibrium temperature of the quenched synthesis gas (22) is near 500° F. Since the shift converter (20) operates at temperatures from 500° to 950° F., preferably 550° F. to 900° F., it may be necessary to warm the inlet gas to the shift converter (20) by heat exchange against the exit gas (not shown). The carbon monoxide shift reaction is slightly exothermic and the temperature of the gas rises across the shift catalyst to a temperature of about 700° F. to 950° F., depending upon the amount of carbon monoxide present and equilibrium conditions. The shift reaction is described in greater detail in U.S. Pat. Nos. 5,152,975 and 3,545,926 which are incorporated herein by reference.

The next step in this preferred embodiment involves purifying the shifted gas mixture (24). The shifted gas mixture (24) consists primarily of carbon dioxide and hydrogen, and impurities, typically including nitrogen, carbon monoxide, methane, hydrogen sulphide, and steam. The shifted gas mixture (24) is cooled to condense steam and remove water (not shown). Chloride (present as HCl) and ammonia, if any, condense out with the water and are removed from the gas. The shifted gas mixture (24) is directed from the shift converter (20) into a hydrogen purification unit (26) to remove remaining impurities from the shifted gas mixture (24).

Any conventional means of purification can be employed. However, in a most preferred embodiment, the purification unit employed is a pressure swing adsorption (PSA) unit (26) which removes the impurities from the shifted gas mixture (24) by adsorbing impurities on a solid sorbent bed from a pressurized gas stream to provide a stream of pressurized purified gas, e.g., hydrogen (28). When the sorbent bed becomes saturated with sorbed impurities, the bed is taken off-stream and the impurities are removed, desorbed, by a reduction in gas pressure. After the impurities have been removed, the sorbent bed can be returned to service for sorbing impurities from the pressurized gas stream. Operating efficiency can be enhanced through use of multiple beds moved, by valving arrangements, in a manner counter to the flow of the gas being purified. See for example, U.S. Pat. No. 3,986,849, incorporated herein by reference. In other purification processes, the shifted gas mixture (24) would typically undergo treatment with an amine solution to absorb acid gases such as carbon dioxide and hydrogen sulfide, followed by a methanation process, or by a copper liquor washing process to remove traces of carbon oxides, and, finally, followed by a molecular sieve dryer process. While the preferred means for effecting the purification of the shifted gas mixture (24) is by way of the PSA unit (26), it is to be understood that other means for purifying the shifted gas mixture (24) can be employed, if desired, in the process of the present invention.

As shown in FIG. 1, two streams emerge from the PSA unit (26). One of the streams is a reject gas stream (8) which includes the separated impurities, such as $N_2$, $CO_2$, CO, $CH_4$, $NH_3$, and $H_2S$, Also included in the reject gas stream (8) is a small amount of unrecovered $H_2$.

The second stream emerging from the PSA unit (26) is a high purity hydrogen stream (28). The hydrogen produced by the process of this invention is at least about 99 percent pure. The high purity hydrogen produced is recovered using conventional means and can be used in a variety of applications. These include, but are not limited to, hydrotreating, hydroprocessing, hydrocracking, methanol production, oxoalcohol production, isomerization processes, etc.

The Recycle Synthesis Gas Stream

The process of the present invention uses recycle synthesis gas (30) as a low hydrocarbon heat content moderator, which is available on demand and at high pressure. For purposes of the present invention, synthesis gas is defined as the product of a partial oxidation reaction that has been water scrubbed to remove particulates and which may or may not have received additional processing.

The recycle synthesis gas (30) can be taken off at several points in the process of the present invention. As described above, the synthesis gas produced by a partial oxidation reaction emerges from the reactor at a temperature of about 2200°–2800° F. The gas and any associated particulates are either directly quenched in water or cooled in a heat recovery unit prior to water scrubbing to remove the particulates. If hydrogen is the intended product to be derived from the synthesis gas, the synthesis gas from the partial oxidation unit (18) is directly quenched in water followed by water scrubbing. The water scrubbed synthesis gas (22) will also contain steam, in quantities depending upon system operating pressure and whether quench or indirect heat exchange was used to cool the partial oxidation reactor effluent. In one embodiment, the water-scrubbed synthesis gas (22) can be used as a recycle synthesis gas (30), either directly from the water scrubber, or after being cooled to condense out steam and with removal of liquid water. The water-scrubbed synthesis gas (22) can be passed over a carbon monoxide shift catalyst (20) to convert carbon monoxide present in the gas to hydrogen and carbon dioxide (preferably with water-scrubbed partial oxidation reaction gas that was directly quenched in water). In another embodiment, the shifted gas mixture (24) can be used as a recycle synthesis gas (30), either before or after cooling to condense out steam and removal of liquid water. The cooled shifted gas mixture (24) can be further treated to remove acid gas and other contaminants, such as carbon dioxide and hydrogen sulfide (if present). In yet another embodiment of the present invention, the resulting hydrogen product can be used as a recycle synthesis gas (30). FIG. 1 depicts this embodiment. Again, depending on the desired end product, even the reject gases (8), e.g., a mixture of carbon dioxide and methane from a PSA, can be used as a recycle gas for the purposes of this invention. Although the recycle synthesis gas as defined above for the purposes of this invention may be tapped from a series of locations as described above, two preferred sources of recycle synthesis gas are shown in FIG. 1 and FIG. 2.

In FIG. 1, the preferred recycle synthesis gas is hydrogen taken from the high purity hydrogen stream (28) as produced when other gasifier effluent components are removed (e.g., by means of a pressure swing adsorption unit). It should be noted that recycle of hydrogen does not necessarily decrease the capacity of a PSA unit to generate hydrogen product. The capacity of a PSA unit is dependent upon the quantity of impurities to be adsorbed and then rejected.

Figure 2:
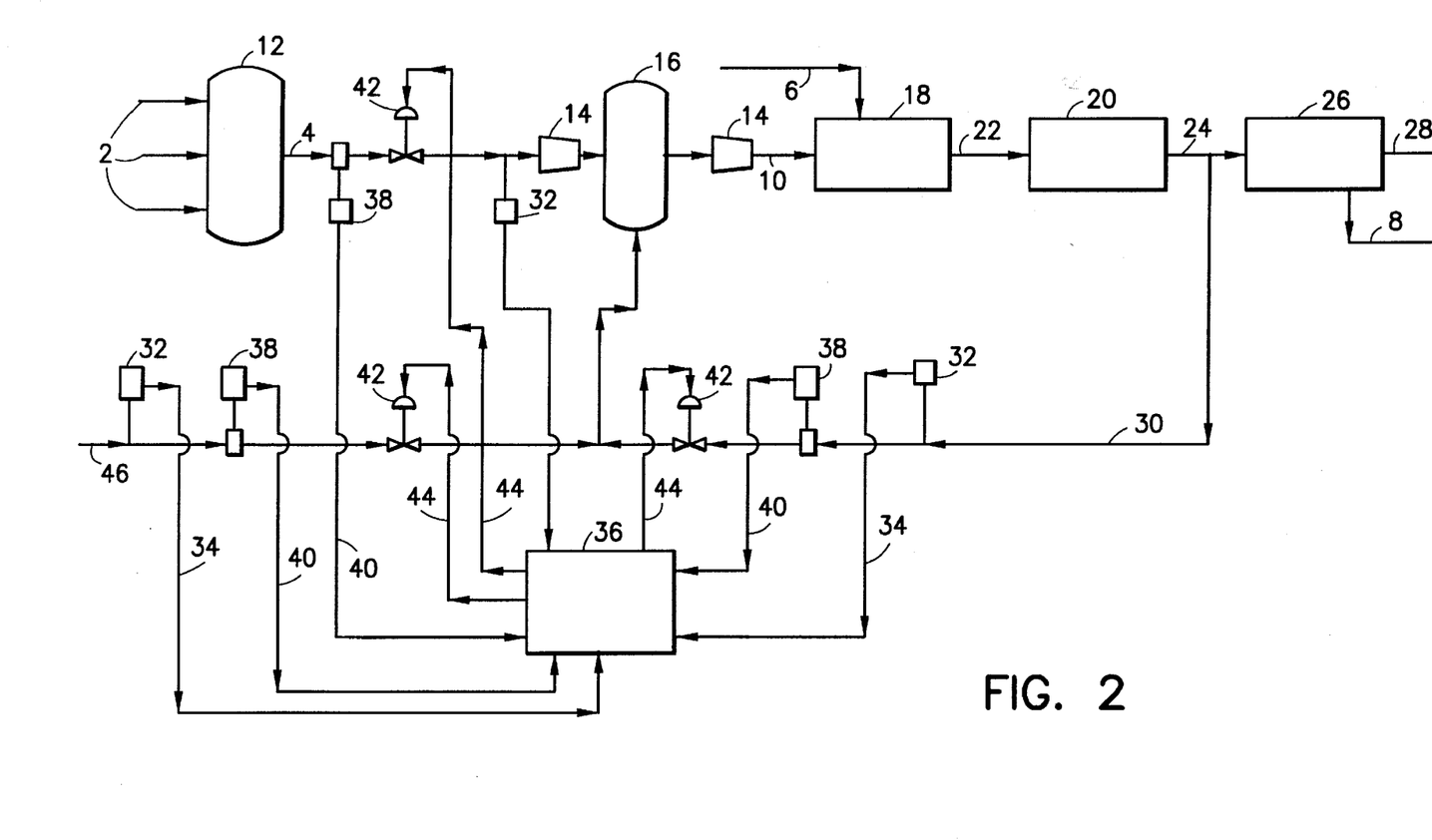
FIG. 2 is a schematic illustration of an alternative embodiment of the present invention.

In FIG. 2, another preferred source of the recycle synthesis gas (30) is the shifted gas mixture stream (24). This shifted gas mixture (24) is a particularly attractive agent for moderating incoming combined raw feed-gas stream (4). The shifted gas mixture (24) is available at high (partial oxidation unit) pressure and can be introduced into the variable composition combined raw feed-gas stream (4) as required during the compression (14) of the off-gas. In particular, the refinery off-gas generally available at 100 psig needs to be compressed to circa 1000 psig. This is generally achieved in two stages of compression (14). The shifted gas mixture (24) is available at about 900 psig and can be added in the intermediate stage of off-gas compression (16). Heavy components in the off-gas may condense out of the gas in the inter-stage cooler (16) after compression. The injection of the recycle gas (30) into the inter-stage cooler (16) will lower the heavy components partial pressure and therefore it will generally prevent heavy compounds from condensing. Normally, the compressed gases are kept warm, but should be maintained at an elevated temperature to prevent liquid condensation. A temperature of 400° F. will maintain components up to $C_4$, and limited amounts of $C_5$ and $C_6$, in the gaseous phase. The partial oxidation unit feed-gas stream (10) (refinery off-gas stream plus recycle synthesis gas) can be heat exchanged (indirect heating) against the hot effluent from the carbon monoxide shift unit (20) for this purpose (not shown).

Control of Feed-Gas Flow Rate and Hydrocarbon Heat Content

The present invention maintains the partial oxidation unit feed-gas stream (10) to the partial oxidation unit (18) at a design flow rate, $F_D$, and a design hydrocarbon heat content, $H_D$. Choosing the design flow rate and design hydrocarbon heat content is well within the ability of one skilled in the art, and is based on factors including, but not limited to, product volume requirements, nature of the feed stock, desired partial oxidation unit operating temperature, and feed stock preheat, etc. By virtue of the present invention, the partial oxidation operation remains steady, with oxygen stream (6) flow rates essentially steady and net hydrogen production through product stream (28) essentially steady, despite changes in the hydrocarbon heat content of the combined raw feed gas stream (4).

The first step in the control of feed-gas flow rate and hydrocarbon heat content is to determine the hydrocarbon heat contents $H_O$, of the combined raw feed-gas stream (4), and $H_R$, of the recycle gas stream (30). The next step is to adjust the flow rates $F_R$, of the recycle gas stream (30), and $F_O$, of the combined raw feed-gas stream (4), according to the following equations:

$$F_O = F_D \frac{(H_D - H_R)}{(H_O - H_R)}, \quad (I)$$

if $H_O$ is greater than $H_D$; or $$F_O = F_D, \quad (II)$$

if $H_O$ is less than or equal to $H_D$; and $$F_R = F_D - F_O. \quad (III)$$

In other words, if the hydrocarbon heat content, $H_O$, of the combined raw feed-gas stream (4) increases above the design hydrocarbon heat content, $H_D$, then the flow rate, $F_O$, of the combined raw feed-gas stream (4) is decreased according to Equation (I), the flow rate of the recycle gas stream (30) is calculated according to Equation (III), and the recycle gas stream (30) is combined with the combined raw feed-gas stream (4) to form the partial oxidation unit feed-gas stream (10). The result is a partial oxidation unit feed-gas stream (10) with an essentially constant flow rate, $F_D$, and an essentially constant hydrocarbon heat content, $H_D$.

Under normal partial oxidation reaction conditions, only traces of hydrocarbon (generally only about 0.03 to about 0.3 mol per cent methane) are present in the synthesis gas stream (22). Consequently, if the recycle synthesis gas is tapped from the synthesis gas stream (22) or from the shifted gas stream (24), it is effectively an inert moderator gas in the partial oxidation reaction. Hydrogen, tapped from the product stream (28), is also an inert partial oxidation moderator gas. When these gases are used as the recycle moderator gas, the hydrocarbon heat content $H_R$, of the recycle gas stream (30), is approximately zero, and Equation (I) can be simplified to:

$$F_O = F_D \frac{H_D}{H_O} \quad (IV)$$

On the other hand, recycle gas tapped from the reject gas stream (8) from the PSA unit (26) may have up to about 5 mol per cent methane (particularly if carbon dioxide has been removed from it, e.g., by pressurization and cooling or by acid gas scrubbing). Hence, the reject gas can contribute hydrocarbon fuel values to the partial oxidation reaction. In this case, the hydrocarbon heat content of the recycle can not be neglected and the Equation (I), including the $H_R$ term, must be used.

More specifically, the control of feed-gas stream (10) hydrocarbon heat content and flow rate is achieved through the following steps:

The hydrocarbon heat contents $H_O$, of the combined raw feed-gas stream (4), and $H_R$, of the recycle gas stream (30), are determined by hydrocarbon heat content analyzing means (32), which can be any suitable hydrocarbon heat content analyzing means known to those skilled in the art or yet to be discovered. If the synthesis gas stream (22), the shifted gas mixture (24) or the hydrogen stream (28) is tapped to provide the recycle gas stream (30), the step of analyzing the recycle gas for hydrocarbon heat content can be skipped, because it is known to be about zero.

One means for determining the hydrocarbon heat content $H_O$, of the combined raw feed-gas stream (4), and, if necessary, the hydrocarbon heat content $H_R$, of the recycle gas stream (30), is though nuclear magnetic resonance (not shown). One such application is disclosed in U.S. patent application Ser. No. 7/960,323, filed Oct. 13, 1992 and incorporated herein by reference. Chemical compositional information can be obtained from an NMR spectrum because the spectrum contains separate signals which tell how many different kinds of protons there are in a molecule. The position of each signal discloses the electronic environment of each proton in the molecule or sample and the intensity is proportional to the number of each proton type. The hydrocarbon molecules which comprise a mixture and the relative concentration of each component can be determined from the NMR spectrum. The NMR phenomenon is independent of the sample's physical state and any hydrogen containing species including $H_2$, $H_2O$, $NH_3$, and $H_2S$ can therefore be identified by proton NMR. Non-hydrogen containing components, e.g., $N_2$, CO, and $CO_2$ are not identified by proton NMR, and thus the absolute concentrations of hydrocarbons in a gas sample can be determined through calibration with known compositions observed at the same conditions of temperature and pressure. Analysis of a flowing pressurized gas is obtainable in a non-intrusive manner and the hydrocarbon heat content per unit volume calculated in time to effect any necessary process changes before the gas reaches the partial oxidation reactor (18).

The next step is to generate signals which represent the hydrocarbon heat contents of the combined raw feed-gas stream (4) and the recycle gas stream (30) and transmit them by a first transmission means (34) (comprising any suitable transmission means, e.g. wire means) to an evaluating means (36).

The evaluating means (36) may be any suitable evaluating means, such as, for example, a computer or a process logic controller. The evaluating means (36) compares $H_O$, the measured hydrocarbon heat content of the combined raw feed-gas stream (4), to $H_D$, the design hydrocarbon heat content. Next, the evaluating means (36) calculates flow rates $F_R$, for the recycle gas stream (30), and $F_O$, for the combined raw feed-gas stream (4), according to equations (I)-(III) above, which, when implemented as described below, will provide a partial oxidation unit feed-gas stream (10) having a flow rate approximately equal to the design flow rate, $F_D$, and a hydrocarbon heat content approximately equal to the design hydrocarbon heat content, $H_D$.

When the recycle gas stream (30) comprises synthesis gas which is tapped from synthesis gas stream (22), the shifted gas mixture (24), or the hydrogen stream (28), each of which is known to have a hydrocarbon heat content of about zero, this value can be programmed directly into the evaluating means (36) without the need for measuring it or for generation and transmission of signals related to $H_R$. In this case it is preferable to use Equation (IV), above, in place of Equation (I).

In addition, the design flow rate, $F_D$, and the design hydrocarbon heat content, $H_D$, are preferably programmed directly into the evaluating means (36)).

In the next step, the flow rates which have been calculated for $F_R$, the flow rate of the recycle gas stream (30) and $F_O$, the flow rate of the combined raw feed-gas stream (4) are imposed upon these streams. Preferably, this is accomplished by the following steps. The actual flow rates of the combined raw feed-gas stream (4) and the recycle gas stream (30) are measured by flow sensing means (38) which can be any suitable flow sensing means, e.g., a turbometer or an orifice meter. Signals representing these measured flow rates are generated and transmitted to the evaluating means (36) by a second transmission means (40) (e.g., wire means). The evaluating means (36) compares the measured flow rates with the calculated flow rates, and generates signals representing commands to valves (42) located in the recycle gas stream (30) and the combined raw feed-gas stream (4) to adjust the actual flow rates of these streams up or down, as required, to equal the calculated flow rates. These signals are transmitted to the valves (42) by a third transmission means (44).

This is a continuous process. Any time the hydrocarbon heat content of the combined raw feed-gas stream (4) changes, the flow rates of the combined raw feed-gas stream (4) and the recycle gas stream (30) are adjusted to provide a partial oxidation unit feed-gas stream (10) with an approximately constant flow equal to the design flow rate and an optimal design hydrocarbon heat content. Those skilled in the art will appreciate that a tolerance can be built in so that small changes in the hydrocarbon heat content of the combined raw feed-gas stream (4) which would not be sufficient to cause the partial oxidation unit to operate outside the preferred temperature range will not cause the control system to react.

In an alternative embodiment, depicted in FIG. 2, the present invention also insures that the hydrocarbon heat content of the partial oxidation unit feed-gas stream (10) will not fall below the design hydrocarbon heat content, $H_D$. Thus, in addition to the steps already described for decreasing the hydrocarbon heat content of the partial oxidation unit feed-gas stream (10) when the hydrocarbon heat content, $H_O$, of the combined raw feed-gas stream (4) rises above the design hydrocarbon heat content, $H_D$, steps are also taken to increase the hydrocarbon heat content of the partial oxidation unit feed-gas stream (10) when the hydrocarbon heat content, $H_O$, of the combined raw feed-gas stream (4) falls below the design hydrocarbon heat content, $H_D$.

In general, when the hydrocarbon heat content of the combined raw feed-gas stream (4) falls below the design hydrocarbon heat content, $H_D$, then no recycle synthesis gas is added to it. Instead, a supplemental gas stream (46), e.g., a high hydrocarbon heat content gas such as liquefied petroleum gas (which is predominantly propane-propylene) is injected into the combined raw feed-gas stream (4) to raise its hydrocarbon heat content to the design hydrocarbon heat content, $H_D$.

Specifically, this alternative embodiment includes all of the steps which comprise the embodiment depicted in FIG. 1, and, in addition, includes the following steps:

The hydrocarbon heat content $H_S$ of the supplemental gas stream (46) is typically known or measured by a hydrocarbon heat content analyzing means (as described above). If $H_S$ is known, it can simply be programmed into the evaluating means (36). Alternatively, $H_S$ can be measured by heat content analyzing means (32) and a signal generated which is responsive thereto. The signal is transmitted by a transmission means (34) (as described above) to the evaluating means (36) (as described above). The evaluating means (36) compares the hydrocarbon heat content $H_O$, of the combined raw feed-gas stream (4), to the design hydrocarbon heat content, $H_D$, and calculates the desired flow rates $F_O$, for the combined raw feed-gas stream (4), $F_R$, for the recycle gas stream (30), and $F_S$, for the supplemental gas stream (46), according to the following equations:

$$F_O = F_D \frac{(H_D - H_R)}{(H_O - H_R)}$$

$$F_R = F_D - F_O$$

$$F_S = 0,$$

if $H_O$ is greater than $H_D$; or according to the equations:

$$F_0 = F_D \frac{(H_D - H_S)}{(H_0 - H_S)}$$

$$F_R = 0$$

$$F_S = F_D - F_0$$

if $H_0$ is less than $H_D$; or according to the equations $$F_0 = F_D$$

$$F_R = 0$$

$$F_S = 0$$

if $H_0$ is equal to $H_D$,
where $F_D$ represents the design flow rate of the partial oxidation unit feed-gas stream (10).

The next additional step is to set the flow rate of the supplemental gas stream (46) equal to the flow rate calculated for $F_S$. Preferably, this is accomplished by the following steps. The flow rate of the supplemental gas stream (46) is measured using a flow sensing means (38) (as described above). A signal which is responsive to the flow rate of the supplemental gas stream (46) is generated, preferably by the flow sensing means (38), and is transmitted by transmission means (40) (as described above) to the evaluating means (36). The evaluating means (36) then compares the measured flow rate to the calculated flow rate, $F_S$, for the supplemental gas stream (46) and generates a signal which represents a command to a valve (42) which is disposed in the supplemental gas stream (46) to increase or decrease flow, as is required to make the flow rate equal the calculated flow rate, $F_S$. The signal is then transmitted to the valve (42) by a transmission means (44) (as described above) so that the actual flow rate of the supplemental gas stream (46) can be adjusted to the calculated value. Of course this is done in addition to the steps described in the first embodiment wherein the same actions are taken with respect to the combined raw feed-gas stream (4) and the recycle gas stream (30).

This first alternative embodiment results in a partial oxidation unit feed-gas stream (10) which maintains a relatively constant hydrocarbon heat content and flow rate despite high and low fluctuations in feed-gas stream hydrocarbon heat content.

In a second alternative embodiment, the recycle gas stream (30) is tapped from the hydrogen product stream (28) and is added to the combined raw feed-gas stream (4) prior to compression. This stream is then passed over a noble metal catalyst (not shown) prior to compression. When refinery off-gas is compressed, unstable species in the off-gas can form gums during compression of the gas. Unstable hydrocarbons, such as acetylenes and diolefins, can be converted to more stable materials by hydrogenation over a noble metal catalyst. Hence, adding recycle hydrogen, available at high pressure, to the off-gas, then passing the mixture of hydrogen and off-gas over a noble metal catalyst can serve to guard against deposit formation in the gas compressor/heat exchangers.

The following examples are offered to further illustrate the manner and means for practicing certain embodiments of the present invention.

EXAMPLES

Example 1

This example is offered to illustrate typical flow rates and hydrocarbon heat contents for a partial oxidation unit which is being fed from a mixture of refinery off-gases.

Given the following design and measured values:

| | |
|---|---|
| Recycle Gas hydrocarbon heat content ($H_R$) | 0 Btu/scf |
| Raw Feed-gas hydrocarbon heat content ($H_0$) | 1419 Btu/scf |
| Design Feed hydrocarbon heat content ($H_D$) | 1000 Btu/scf |
| Design POx Unit Feed Flow ($F_D$) | 5.2 mmscfd |

The evaluating unit would calculate the following desired flow rates:

$$F_0 = 5.2 \left( \frac{1000}{1419} \right)$$
$$= 3.66 \ mmscfd;$$

and $$F_R = 5.2 - 3.66$$
$$= 1.54 \ mmscfd.$$

Example 2

This example is offered to illustrate typical flow rates and hydrocarbon heat contents for a partial oxidation unit which is being fed from a different mixture of refinery off-gases from the mixture used in Example 1 and which requires a supplemental high hydrocarbon heat content feed-gas.

Given the following values:

| | |
|---|---|
| Raw Feed-gas Hydrocarbon heat content ($H_0$) | 649 Btu/scf |
| Supplemental Gas Hydrocarbon heat content ($H_R$) | 2517 Btu/scf |
| Design Feed hydrocarbon heat content ($H_D$) | 1000 Btu/scf |
| Design Partial oxidation unit Feed Flow ($F_D$) | 5.2 mmscfd |

The evaluating unit would calculate the following flow rates:

$$F_0 = 5.2 \left( \frac{1000 - 2517}{649 - 2517} \right)$$
$$= 4.22 \ mmscfd;$$

and $$F_S = 5.22 - 4.22$$
$$= 0.98 \ mmscfd.$$

We claim:
1. A process for continuously and immediately controlling the hydrocarbon heat content of a partial oxidation unit feed-gas stream comprising the steps of:
   a. determining the hydrocarbon heat content, $H_0$, of a raw feed-gas stream and the hydrocarbon heat content, $H_R$, of a recycle gas stream;
   b. establishing signals which represent the hydrocarbon heat contents of the raw feed-gas stream, $H_0$, and the recycle gas stream, $H_R$;

c. transmitting the signals to an evaluating means which compares the hydrocarbon heat content of the raw feed-gas stream, $H_0$, to a partial oxidation unit feed-gas design hydrocarbon heat content, $H_D$, and which determines:

i. a flow rate for the raw feed-gas stream, $F_0$, according to the equation:

$$F_0 = F_D \frac{(H_D - H_R)}{(H_0 - H_R)},$$

if $H_0$ is greater than $H_D$, or otherwise according to the equation:

$$F_0 = F_D; \text{ and}$$

ii. a flow rate for the recycle gas stream, $F_R$, according to the equation:

$$F_R = F_D - F_0;$$

where $F_D$ represents the design flow rate of a partial oxidation unit feed-gas stream;

d. adjusting the flow rate of the raw feed-gas stream in accordance with the value $F_0$ calculated in step c);

e. adjusting the flow of the recycle gas stream in accordance with the value $F_R$ calculated in step c);

f. combining the raw feed-gas stream and the recycle gas stream, if any, to form the partial oxidation unit feed-gas stream; and g. partially oxidizing the partial oxidation unit feed-gas to produce a synthesis gas mixture comprising carbon monoxide and hydrogen h. quenching the synthesis gas mixture; reacting the synthesis gas mixture with steam over a water gas shift catalyst to convert the carbon monoxide into a shifted gas mixture which primarily includes carbon dioxide and hydrogen; and j. purifying the shifted gas mixture to produce high purity hydrogen and a reject gas mixture of impurities.

2. The process of claim 1 where the raw feed-gas stream comprises a refinery off-gas.

3. The process of claim 1 where the raw feed-gas stream comprises a first refinery off-gas feed originating from a first source and at least one other refinery off-gas feed originating from at least one other source which are mixed to provide the raw feed-gas stream.

4. The process of claim 3 where the refinery off-gases are mixed in a surge tank.

5. The process of claim 1 where the recycle gas stream comprises quenched synthesis gas mixture.

6. The process of claim 1 where the recycle gas stream comprises synthesis gas mixture after it has been reacted with steam over the water gas shift catalyst.

7. The process of claim 1 where the recycle gas stream comprises hydrogen produced in the purification step.

8. The process of claim 1 where the recycle gas stream comprises reject gases produced in the purification step.

9. The process of claim 1 where the recycle gas stream comprises hydrogen produced in the purification step and the combined recycle gas stream and raw feed-gas stream are passed over a noble metal catalyst.

10. The process of claim 1 where the flow rates of the recycle gas stream and the raw feed-gas stream are adjusted by means of valves situated in the respective streams.

11. The process of claim 1 where the hydrocarbon heat content of the raw feed-gas stream, $H_0$, is determined and compared to the partial oxidation unit feed-gas design hydrocarbon heat content, $H_D$, continuously, and the flow rate of the raw feed-gas stream, $F_0$, and the flow rate of the recycle gas stream, $F_R$, are adjusted immediately, whenever the hydrocarbon heat content of the raw feed-gas stream, $H_0$, is greater than the design partial oxidation unit feed-gas stream hydrocarbon heat content, $H_D$.

12. The process of claim 1 where the hydrocarbon heat content, $H_0$, of the raw feed-gas stream and the hydrocarbon heat content, $H_R$, of the recycle gas stream are determined by means of NMR spectroscopy.

13. A process for continuously and immediately controlling the hydrocarbon heat content of a partial oxidation unit feed-gas stream of uncertain composition comprising the steps of:

a. determining the hydrocarbon heat content of a raw feed-gas stream, $H_0$, the hydrocarbon heat content of a recycle gas stream, $H_R$, and the hydrocarbon heat content of a supplemental gas stream, $H_S$;

b. establishing signals which represent the hydrocarbon heat contents of the raw feed-gas stream, $H_0$, the recycle gas stream, $H_R$, and the supplemental gas stream, $H_S$;

c. transmitting the signals to an evaluating means which compares the hydrocarbon heat content of the raw feed-gas stream, $H_0$, to a partial oxidation unit feed-gas design hydrocarbon heat content, $H_D$, and which determines flow rates for the raw gas stream, $F_0$, the recycle gas stream, $F_R$, and the supplemental gas stream, $F_S$, according to the equations:

$$F_0 = F_D \frac{(H_D - H_R)}{(H_0 - H_R)}$$

$$F_R = F_D - F_0$$

$$F_S = 0,$$

if $H_0$ is greater than $H_D$, or according to the equations:

$$F_0 = F_D \frac{(H_D - H_S)}{(H_0 - H_S)}$$

$$F_R = 0$$

$$F_S = F_D - F_0$$

if $H_0$ is less than $H_D$, or according to the equations $$F_0 = F_D$$

$$F_R = 0$$

$$F_S = 0$$

if $H_0$ is equal to $H_D$, where $F_D$ represents the design flow rate of a partial oxidation unit feed-gas stream;

d. adjusting the flow of the recycle gas stream in accordance with the value $F_R$ calculated in step c);

e. adjusting the flow of the supplemental gas stream in accordance with the value $F_S$ calculated in step c);

f. adjusting the flow rate of the raw feed-gas stream in accordance with the value $F_0$ calculated in step c);

g. combining the raw feed-gas stream, the recycle gas stream, if any, and the supplemental gas stream, if any, to form the partial oxidation unit feed-gas stream; and h. partially oxidizing the partial oxidation unit feed-gas to produce a synthesis gas mixture comprising carbon monoxide and hydrogen;

i. quenching the synthesis gas mixture;

j. reacting the synthesis gas mixture with steam over a water gas shift catalyst to convert the carbon monoxide into a shifted gas mixture which primarily includes carbon dioxide and hydrogen; and k. purifying the shifted gas mixture to produce high purity hydrogen and a reject gas mixture of impurities.

14. The process of claim 13 where the raw feed-gas stream comprises refinery off-gas.

15. The process of claim 13 where the raw feed-gas stream comprises a first refinery off-gas feed originating from a first source and at least one other refinery off-gas feed originating from at least one other source which are mixed to provide the raw feed-gas stream.

16. The process of claim 15 where the refinery off-gases are mixed in a surge tank.

17. The process of claim 13 where the recycle gas stream comprises quenched synthesis gas mixture.

18. The process of claim 13 where the recycle gas stream comprises synthesis gas mixture after it has been reacted with steam over the water gas shift catalyst.

19. The process of claim 13 where the recycle gas stream comprises hydrogen produced in the purification step.

20. The process of claim 13 where the recycle gas stream comprises reject gases produced in the purification step.

21. The process of claim 13 where the recycle gas stream comprises hydrogen produced in the purification step and the combined recycle gas stream and raw feed-gas stream are passed over a noble metal catalyst.

22. The process of claim 13 where the flow rates of the recycle gas stream and the raw feed-gas stream are adjusted by means of valves situated in the respective streams.

23. The process of claim 13 where the hydrocarbon heat contents of the raw feed-gas stream, $H_0$, the supplemental feed-gas stream, $H_S$, and the recycle gas stream, $H_R$ are determined by means of NMR spectroscopy.

24. The process of claim 13 where the hydrocarbon heat content of the raw feed-gas stream, $H_0$, is determined and compared continuously to the partial oxidation unit feed-gas design hydrocarbon heat content, $H_D$, and the flow rate of the raw feed-gas stream, $F_0$, and the flow rate of the recycle gas stream, $F_R$, and the flow rate of the supplemental gas stream, $F_S$, are adjusted immediately, whenever the hydrocarbon heat content of the raw feed-gas stream, $H_0$, is greater than the partial oxidation unit feed-gas stream design hydrocarbon heat content, $H_D$.

25. A process for continuously and immediately controlling the hydrocarbon heat content of a partial oxidation unit feed-gas stream comprising the steps of:

a. determining the hydrocarbon heat content, $H_0$, of a raw feed-gas stream;

b. establishing a signal which represent the hydrocarbon heat content of the raw feed-gas stream, $H_0$;

c. transmitting the signal to an evaluating means which compares the hydrocarbon heat content of the raw feed-gas stream, $H_0$, to a partial oxidation unit feed-gas design hydrocarbon heat content, $H_D$, and which determines:

i. a flow rate for the raw feed-gas stream, $F_0$, according to the equation:

$$F_0 = F_D \frac{H_D}{H_0},$$

if $H_0$ is greater than $H_D$, or otherwise according to the equation:

$$F_0 = F_D; \text{ and}$$

ii. a flow rate for the recycle gas stream, $F_R$, according to the equation:

$$F_R = F_D - F_0;$$

where $F_D$ represents the design flow rate of a partial oxidation unit feed-gas stream;

d. adjusting the flow rate of the raw feed-gas stream in accordance with the value $F_0$ calculated in step c);

e. adjusting the flow of the recycle gas stream in accordance with the value $F_R$ calculated in step c);

f. combining the raw feed-gas stream and the recycle gas stream, if any, to form the partial oxidation unit feed-gas stream; and g. partially oxidizing the partial oxidation unit feed-gas to produce a synthesis gas mixture comprising carbon monoxide and hydrogen;

h. quenching the synthesis gas mixture;

i. reacting the synthesis gas mixture with steam over a water gas shift catalyst to convert the carbon monoxide into a shifted gas mixture which primarily includes carbon dioxide and hydrogen; and j. purifying the shifted gas mixture to produce high purity hydrogen and a reject gas mixture of impurities.

26. The process of claim 25 where the recycle gas stream comprises quenched synthesis gas mixture.

27. The process of claim 25 where the recycle gas stream comprises synthesis gas mixture after it has been reacted with steam over the water gas shift catalyst.

28. The process of claim 25 where the recycle gas stream comprises hydrogen produced in the purification step.

29. The process of claim 25 which further comprises the steps of:

a) determining the hydrocarbon heat content of a supplemental gas stream, $H_S$;

b) programming the value for $H_S$ into the evaluating means;

c) determining flow rates for the raw gas stream, $F_0$, the recycle gas stream, $F_R$, and the supplemental gas stream, $F_S$, according to the equations:

$$F_0 = F_D \frac{H_D}{H_0}$$

$$F_R = F_D - F_0$$

$$F_S = 0,$$

if $H_0$ is greater than $H_D$, or according to the equations:

$$F_0 = F_D \frac{(H_D - H_S)}{(H_0 - H_S)}$$

$$F_R = 0$$

$$F_S = F_D - F_0$$

if $H_0$ is less than $H_D$, or according to the equations $$F_0 = F_D$$

$$F_R = 0$$

$$F_S = 0$$

if $H_0$ is equal to $H_D$, where $F_D$ represents the design flow rate of a partial oxidation unit feed-gas stream d) adjusting the flow of the supplemental gas stream in accordance with the calculated value $F_S$.

30. The process of claim 25 wherein the hydrocarbon heat content, $H_0$, of the raw feed-gas stream is measured by means of NMR spectroscopy.

\* \* \* \* \*